United States Patent [19]

Barden

[11] Patent Number: 5,596,826
[45] Date of Patent: Jan. 28, 1997

[54] LEVEL INDICATING MECHANISM FOR A WORK MACHINE

[75] Inventor: William M. Barden, Raleigh, N.C.

[73] Assignee: Caterpillar Inc., Peoria, Ill.

[21] Appl. No.: 544,749

[22] Filed: Oct. 18, 1995

[51] Int. Cl.$^6$ ............................... A01B 15/10; G01C 9/36
[52] U.S. Cl. .................. 37/466; 33/333; 172/430
[58] Field of Search ................... 33/333, 354, 370; 37/465, 466, 906, 924, 195; 414/222, 273, 416, 626, 797.1, 900; 172/4, 4.5, 450, 430

[56] References Cited

U.S. PATENT DOCUMENTS

| | | | |
|---|---|---|---|
| 2,292,241 | 8/1942 | Reeves | 33/333 X |
| 2,306,373 | 12/1942 | Belden | 33/370 |
| 2,565,615 | 8/1951 | McCoy | 33/370 |
| 3,034,220 | 5/1962 | Fell | 33/212 |
| 3,443,705 | 5/1969 | Buttram | 214/138 |
| 3,763,570 | 10/1973 | Andersen | 33/333 X |
| 3,846,781 | 11/1974 | Smith | 172/4.5 X |
| 3,900,073 | 8/1975 | Crum | 33/354 X |
| 3,916,531 | 11/1975 | Morton | 33/333 |
| 3,997,071 | 12/1976 | Teach | 214/761 |
| 4,295,279 | 10/1981 | Sienknecht | 33/334 |
| 4,506,450 | 3/1985 | Fleming et al. | 33/366 |
| 4,583,296 | 4/1986 | Dell'Acqua | 33/366 |
| 5,079,847 | 1/1992 | Swartz et al. | 33/366 |
| 5,450,909 | 9/1995 | Stevenson | 172/450 |

Primary Examiner—Terry Lee Melius
Assistant Examiner—Robert Pezzuto
Attorney, Agent, or Firm—Claude F. White; Diana L. Charlton

[57] ABSTRACT

A level indicating mechanism for indicating to a machine operator the relative level position of a work machine includes a circular ring magnet and a bullseye level instrument positioned within the ring magnet. A potting material surrounds the level instrument and connects it to the ring magnet. The level indicating mechanism is adapted to be removably secured to portions of the work machine and be visable to the machine operator. The angular orientation of the work machine is adjustable by stabilizing apparatus to bring the work machine to a level position with respect to the ground surface.

10 Claims, 2 Drawing Sheets

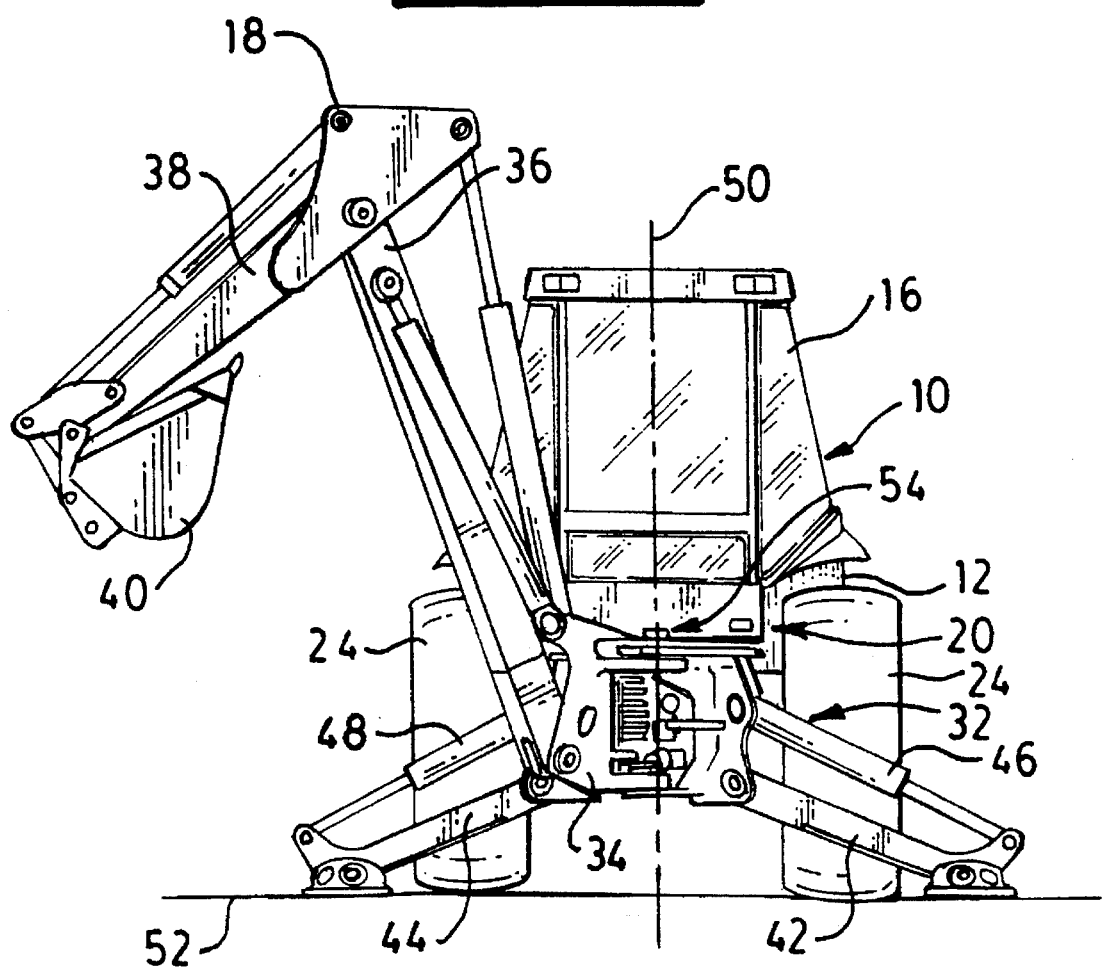

LEVEL INDICATING MECHANISM FOR A WORK MACHINE

TECHNICAL FIELD

This invention relates generally to excavating type work machines and more particularly to apparatus which is adapted to indicate the relative level position of the work machine.

BACKGROUND ART

Excavating type machines, including backhoe loader machines, are equipped with a bucket mechanism for digging trenches and other excavations. Such trenches are used for installing underground utilities, pipelines, and other buried apparatus. These excavations are often in close proximity to buildings, sidewalks, or other buried utilities. To prevent damage to such adjacent structures and/or other buried objects, it is important that such excavations be as straight, in a vertical plane, as possible. Most excavating type machines are equipped with some type of stabilizing arms to remove the machine weight from the machine wheels and stabilize the machine during the digging operation. These stabilizing arms are also used to level the machine with respect to the surface which supports the machine. However, such leveling operation is only an approximation and is dependant entirely on the judgment of the machine operator. If the operator's judgment is not good, the excavation may be angled considerably, which may result in damage to adjacent structures or to previously buried cables or pipelines, or make machine harder to control as digging arm goes "over center" and accelerates.

The present invention is directed to overcoming one or more of the problems as set forth above.

DISCLOSURE OF THE INVENTION

In one aspect of the present invention, a level indicating mechanism for indicating the relative level position of a work machine includes a circular magnet and a level instrument positioned within the magnet. The level instrument and the magnet are connected together by a potting material which surrounds the level instrument. The level instrument can include a bullseye bubble type level and the level indicating mechanism is adapted to be removably secured to the work machine.

Excavating machines, including multiple task performing backhoe loading machines, are often utilized to dig trenches and make excavations in areas that are adjacent to buildings and structures, or are adjacent to existing buried cables or pipelines. To prevent damage to such existing structures or buried utilities, it is important that the trench or excavation be straight and as vertically oriented as possible. The orientation of the work machine, with respect to the trench and existing structures is adjusted by the machine operator utilizing machine stabilizing structures. The level position is determined from experience and practice and is generally a rough estimate of an actual level condition of the machines' digging assembly.

The subject level indicating mechanism offers a solution to the above noted problems and takes the guess work out of leveling the work machine prior to the digging operation.

BRIEF DESCRIPTION OF THE DRAWINGS

FIG. 3 is a diagrammatic rear view of the work machine shown in FIG. 1.

BEST MODE FOR CARRYING OUT THE INVENTION

Figure 1:
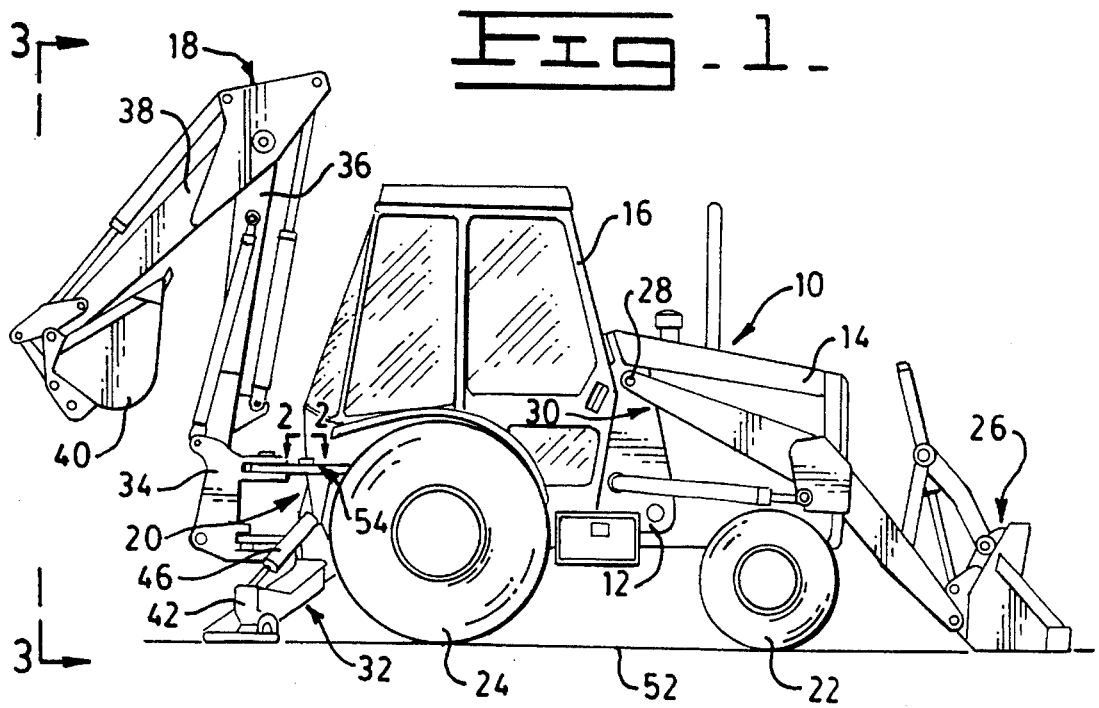
FIG. 1 is a diagrammatic side elevational view of work machine and the subject level indicating mechanism.
Figure 2:
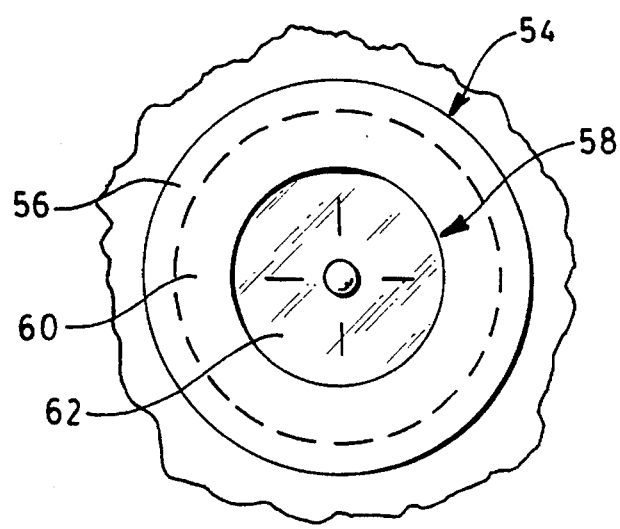
FIG. 2 is a diagrammatic plan view of the subject level indicating mechanism, taken generally along lines 2—2 of FIG. 1.

With reference to the drawings, a work machine 10 for performing a variety of work functions includes a frame structure 12, an engine 14 for providing power to the work machine 10, an operator's compartment 16 which is supported on the frame structure 12, and a digging assembly 18 which is supported on the frame structure 12 and is connected to the rear portion 20 of the work machine 10. The work machine 10 further includes front wheels 22 and rear wheels 24 for supporting and propelling the work machine 10. The work machine 10 if of a type commonly referred to as a backhoe loader and further includes a loader bucket assembly 26 which is pivotally connected at 28 to the frame structure 12 at the front portion 30 of the machine 10.

The digging assembly 18 includes a stabilizing apparatus 32, a swing frame or bracket 34, a boom member 36, a stick member 38, and a digging bucket 40. The stabilizing apparatus 32 includes first and second stabilizing arms 42,44 and respective first and second fluid powered cylinders 46,48 connected between the swing frame 34 and the respective stabilizing arms 42,44. The stabilizing apparatus 32 is adapted to stabilize the work machine 10 during a digging operation and also serves to tilt the machine 10 and digging assembly 18 relative to a vertical plane 50 which is normal to the ground surface 52 which supports the work machine 10.

A level indicating mechanism 54 which is removably positioned on the work machine 10 includes a magnet 56, a level instrument 58 positioned within the magnet 56, and a potting material 60, such as an epoxy, adapted to surround the level instrument 58 and secure it to the magnet 56. The level instrument 58 includes a bullseye level 62. The level indicating mechanism 54 is adapted to indicate the relative level position of the work machine 10, and the digging assembly 18, with respect to the ground surface 52 which supports the work machine 10. The level indicating mechanism 54 is preferably removably connected to the machine frame 12, where it is easily visible to the operator of the digging assembly 18 during a digging operation. Since the level indicating mechanism 54 is held to the frame 12 by the magnet 56, it can easily be removed and connected to other metal portions of the work machine 10. Although a circular ring magnet 56 is shown, other types of magnets, such as strip magnets, could be used to hold the level 62 to the machine frame 12.

Industrial Applicability

With reference to the drawings, and to the previous detailed description, the subject level indicating mechanism 54 is particularly useful with excavating type work machines, such as a backhoe loader machine 10. Such work machines 10 are utilized to excavate trenches for burying pipelines and utilities, as well as excavating and uncovering previously buried materials. When working in close proximity to buildings or other structures, or adjacent other buried cables or pipes, it is extremely important that the excavated trench be as straight vertically as possible. The subject level indicating mechanism 54 provides the operator of the work machine 10 with the information he needs to dig such a trench.

When the work machine 10 and digging assembly 18 have been positioned to begin an excavation, the machine operator places the level indicating mechanism 54 on the swing frame 34 where it is held by the circular ring magnet 56. The machine operator can then adjust the machine 10 and the digging assembly 18, with respect to the ground surface 52 and the vertical plane 50, by operating the first and second cylinders 46,48 to extend or retract the first and second stabilizing arms 42,44 to bring the machine 10 to a level position, as indicated by the level instrument 58. The operator then performs the digging operation, and the level indicating apparatus can be removed and stored inside the operator's compartment, or on other locations of the work machine 10.

Other aspects, objects, and advantages of this invention can be obtained from a study of the drawings, the disclosure, and the appended claims.

What is claimed is:

1. A level indicating mechanism, comprising:

means for indicating to an operator a relative level position of an excavating machine with respect to a surface which supports the excavating machine;

said indicating means including a magnet, a level instrument associated with the magnet, and a potting material adapted to secure said level instrument to said magnet.

2. A level indicating mechanism, as set forth in claim 1, wherein said excavating machine has a digging assembly and said level indicating mechanism is adapted to be removably secured adjacent said digging assembly.

3. A level indicating mechanism, as set forth in claim 1, wherein said potting material includes an epoxy material.

4. A level indicating mechanism, as set forth in claim 1, wherein said level instrument includes a bullseye bubble level, and said magnet includes a circular ring magnet.

5. A level indicating mechanism, as set forth in claim 2, wherein said digging assembly includes a digging tool and a frame supporting bracket, said level indicating mechanism being adapted to be removably secured to said bracket.

6. A level indicating mechanism, as set forth in claim 2, wherein said work machine includes stabilizing apparatus for tilting the digging assembly relative to a vertical plane which is normal to the machine supporting surface.

7. A work machine adapted for performing a variety of work functions, comprising:

a frame structure;

an engine for providing power to the work machine;

an operator's compartment supported on said frame structure;

a digging assembly supported on said frame structure, including stabilizing apparatus for stabilizing the work machine and for tilting the digging assembly relative to a vertical plane which is normal to a work machine supporting surface; and a level indicating mechanism adapted to be removably positioned on said work machine for indicating to an operator a relative level position of said work machine with respect to the work machine supporting surface.

8. A work machine, as set forth in claim 7, wherein said level indicating mechanism includes a circular magnet, a level instrument positioned within the magnet, and a potting material adapted to surround and secure the level instrument to said magnet.

9. A work machine, as set forth in claim 7, wherein said stabilizing apparatus includes first and second stabilizing arms and first and second fluid powered cylinders connected to said respective stabilizing arms, said stabilizing arms being adapted to tilt said digging assembly relative to a vertical plane which is normal to the machine supporting surface.

10. A work machine, as set forth in claim 7, wherein said level instrument includes a bullseye bubble level.

\* \* \* \* \*